United States Patent
Rodrigues et al.

(10) Patent No.: US 10,604,239 B2
(45) Date of Patent: Mar. 31, 2020

(54) METHOD FOR ROTATIONALLY DRIVING THE WHEEL OF AN AIRPLANE

(71) Applicant: MESSIER-BUGATTI-DOWTY, Velizy Villacoublay (FR)

(72) Inventors: Fernand Rodrigues, Velizy-Villacoublay (FR); Frederic Martin, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 15/003,191

(22) Filed: Jan. 21, 2016

(65) Prior Publication Data

US 2016/0214709 A1 Jul. 28, 2016

(30) Foreign Application Priority Data

Jan. 23, 2015 (FR) .................................. 15 50553

(51) Int. Cl.
*B64C 25/40* (2006.01)
*B64C 25/34* (2006.01)
*F16H 13/02* (2006.01)

(52) U.S. Cl.
CPC ............ *B64C 25/405* (2013.01); *B64C 25/34* (2013.01); *F16H 13/02* (2013.01); *Y02T 50/823* (2013.01)

(58) Field of Classification Search
CPC ..... B64C 25/40; B64C 25/405; F16D 25/088; F16D 13/10; F16D 25/065; F16D 2500/1024; B62M 11/00; B62M 11/12; B62M 2700/003; B62M 2701/0023; B62M 13/04; F16H 13/02

USPC ............ 119/103 S; 474/85–87; 301/6.2, 6.5; 305/33, 184
See application file for complete search history.

(56) References Cited

U.S. PATENT DOCUMENTS

| | | | | |
|---|---|---|---|---|
| 320,024 A | * | 6/1885 | Weimer | ................... F16D 13/10 192/110 R |
| 565,691 A | * | 8/1896 | Reeves | ................... F16D 13/10 192/79 |
| 2,103,616 A | * | 12/1937 | Gartner | ................... B62M 11/00 280/223 |
| 2,190,112 A | * | 2/1940 | Brandenburg | .......... B41B 11/38 199/51 |
| 2,347,986 A | * | 5/1944 | Bowerman | ............. B64C 25/40 244/103 S |
| 2,451,453 A | * | 10/1948 | Tuxhorn | ................. B64C 25/40 188/293 |
| 2,493,275 A | * | 1/1950 | Cyril | ........................ B62M 7/10 180/221 |

(Continued)

*Primary Examiner* — Christopher D Hutchens
(74) *Attorney, Agent, or Firm* — Sughrue Mion, PLLC

(57) ABSTRACT

An assembly for rotationally friction driving the wheel of an airplane provided with a driving track. The assembly has a base intended to be fixed to a lower part of the landing gear, two arms mounted to pivot on the base, and rollers so mounted as to rotate at the end of each arm, with each roller being associated with a pinion for rotationally driving the roller. A central pinion is mounted so as to rotate along the arms pivot axis so that the rollers driving pinions engage with the central pinion. A drive actuator acts on the arms of the assembly so as to position the assembly either in a disengaged position in which the rollers are separated from the driving track, or in an engaged position in which the rollers are held to rest on the driving track.

10 Claims, 2 Drawing Sheets

(56) References Cited

U.S. PATENT DOCUMENTS

| | | | | |
|---|---|---|---|---|
| 3,005,510 | A * | 10/1961 | Phillips | B64C 25/405 180/14.7 |
| 3,431,994 | A * | 3/1969 | Wood, Jr. | B62M 6/75 180/206.8 |
| 3,542,318 | A * | 11/1970 | Ellsworth | B64C 25/40 244/103 S |
| 3,873,128 | A * | 3/1975 | Dunder | B62M 11/12 280/236 |
| 4,526,106 | A * | 7/1985 | Okada | G01M 3/005 104/138.2 |
| 5,142,989 | A * | 9/1992 | Suzumori | F16L 55/26 104/138.2 |
| 7,181,985 | B2 * | 2/2007 | MacMillan | F16L 55/30 73/865.8 |
| 7,505,063 | B1 * | 3/2009 | Bastedo | B08B 9/043 15/104.05 |
| 8,887,842 | B2 * | 11/2014 | Peck | B60G 3/08 180/24.03 |
| 2010/0147995 | A1 * | 6/2010 | Cros | B64C 25/405 244/50 |
| 2012/0217340 | A1 * | 8/2012 | Essinger | B64C 25/405 244/50 |
| 2013/0026284 | A1 * | 1/2013 | Christensen | B64C 25/405 244/50 |
| 2015/0097077 | A1 * | 4/2015 | Himmelmann | B64C 25/405 244/50 |
| 2015/0210385 | A1 * | 7/2015 | Didey | B64C 25/405 244/50 |
| 2015/0321751 | A1 * | 11/2015 | Mazarguil | B64C 25/34 301/6.2 |

* cited by examiner

METHOD FOR ROTATIONALLY DRIVING THE WHEEL OF AN AIRPLANE

The invention relates to a method for rotationally driving the wheel of an airplane

TECHNICAL BACKGROUND OF THE INVENTION

Various methods have been provided for driving a wheel fitted on an airplane landing gear. More particularly, it has been provided to drive the wheel using a driving actuator comprising a terminal pinion engaging with a girth gear integral with the wheel. A clutch system is provided between the motor drive and the terminal pinion to enable the wheel to rotate freely. However, the terminal pinion remains permanently engaged with the girth gear, which is disadvantageous as regards security.

Using a rotating driving actuator with an output shaft supporting a roller cooperating with a driving track integral with the wheel has also been proposed. Such arrangement however has many drawbacks. Specifically, for safety reasons, it must be possible to disengage the roller from the driving track of the wheel, which requires using a movable actuator. Such arrangement can be hardly implemented. Besides, the transmission of the entire motor torque by only one roller turns out to be difficult.

OBJECT OF THE INVENTION

The invention aims at providing means for rotationally driving the wheel of an airplane which has none of the above-mentioned drawbacks.

SUMMARY OF THE INVENTION

For this purpose, an assembly is provided for rotationally friction driving the wheel of an airplane provided with a driving track and so mounted as to rotate about an axis of rotation on an axle carried by the lower part of an airplane landing gear, with the assembly comprising:
- a base intended to be fixed to the lower part of the landing gear;
- two arms mounted to pivot on the base;
- rollers so mounted as to rotate at the end of each arm, with each roller being associated with a pinion for rotationally driving the roller;
- a central pinion so mounted as to rotate along the arms pivot axis so that the rollers driving pinions engage with the central pinion;
- actuating means so acting on the arms of the assembly as to position same either in a disengaged position in which the rollers are separated from the driving track, or in an engaged position in which the rollers are held to rest on the drive track with a predetermined bearing force.

Such an assembly ensures an equal support of both rollers by the track according to the deformations thereof, with a constant bearing force determined by the force of the actuating means. Controlling the arms spacing makes it possible to easily control the engaging and disengaging of the rollers, without it being necessary to provide an integrally movable driving actuator. The latter may be stationary.

For this purpose, and according to a particular aspect of the invention, a device for rotationally friction driving the wheel of an airplane provided with a driving track and so mounted as to rotate about an axis of rotation on an axle carried by the lower part of an airplane landing gear is provided, with the device comprising:
- at least one driving assembly so positioned as to cooperate with the wheel to be driven;
- a rotational driving actuator integral with the lower part having an output shaft;
- means for transmitting a rotation motion between the output shaft of the driving actuator and the central pinion of the assembly.

The actuator output shaft is preferably so mounted as to rotate along an axis of rotation parallel to the axes of rotation of the rollers, with the transmission means comprising a flexible endless driving element, of the chain, belt, cable type or similar, wound around a driving member integral with the output shaft of the driving actuator, and around a driving member associated with the central pinion of the assembly.

BRIEF DESCRIPTION OF THE FIGURES

The invention will be better understood upon reading the following description of one specific embodiment of the invention, and while referring to the appended figures, wherein.

DETAILED DESCRIPTION OF AN EMBODIMENT OF THE INVENTION

Figure 1:
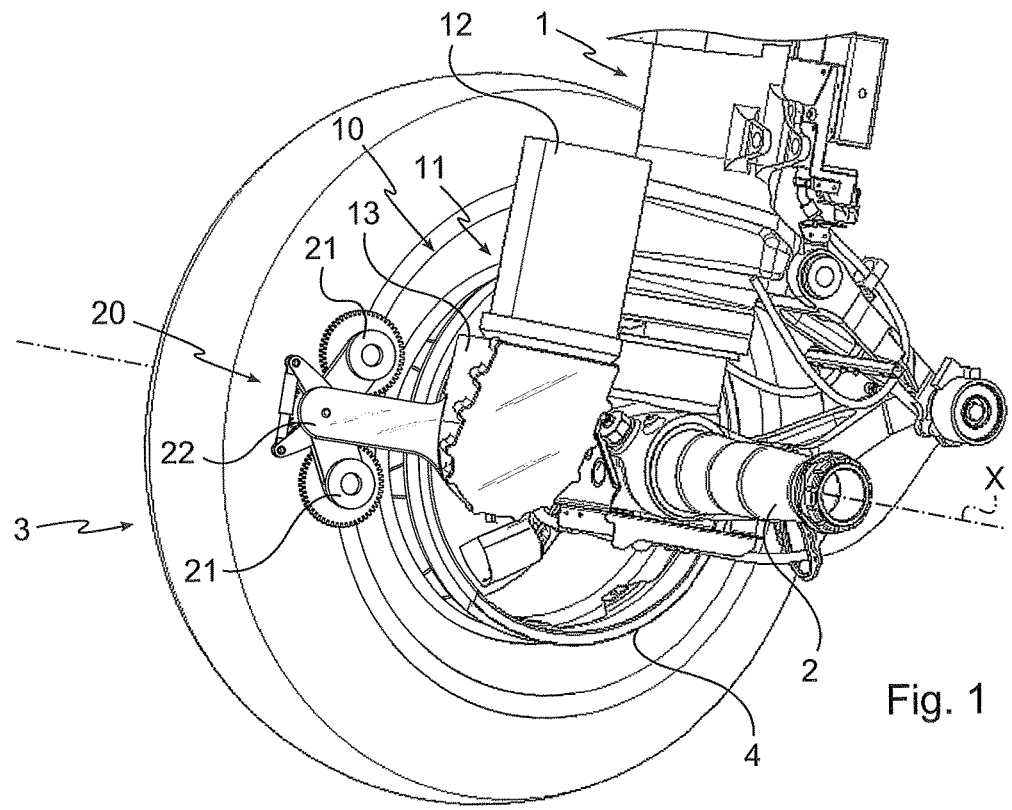
FIG. 1 is a perspective view of the lower part of an airplane landing gear (with one of the wheels not being shown for greater clarity) provided with a driving system according to the invention of one assembly.
Figure 2:
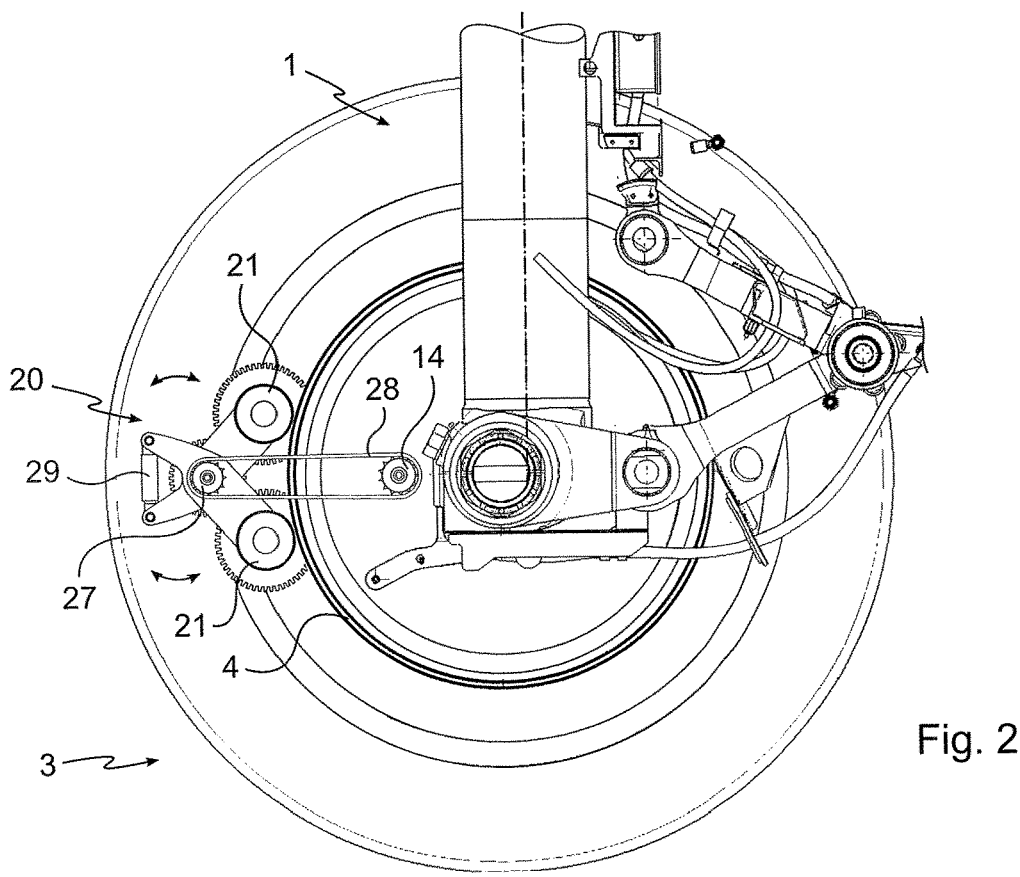
FIG. 2 is a side view of the landing gear of FIG. 1 showing the arrangement of the assembly relative to the wheel.

As shown in FIGS. 1 and 2, the invention can be applied to an airplane landing gear 1 carrying an axle 2 in its lower part to receive wheels 3 (only one of which is shown) and to enable the rotation thereof about an axis of rotation X. Each wheel is here equipped with a driving track 4 which is fitted onto the rim of the wheel. The landing gear 1 is provided with a driving device 10 according to the invention, which comprises a driving actuator 11, the electric motor 12 of which is shown, associated with a reducer 13 for driving an output shaft (not shown in FIG. 1, but the output wheel 14 of which is shown in FIG. 2). The actuator 11 is associated with an assembly 20, positioned at the end of a base 22 fixed on the lower part of the landing gear, and comprising two rollers 21 intended to cooperate with the driving track 4. The position of the assembly 20 relative to the wheel is shown in FIG. 2. The base 22 and the driving actuator 11 are not shown in this Figure for a greater clarity.

Figure 3A:
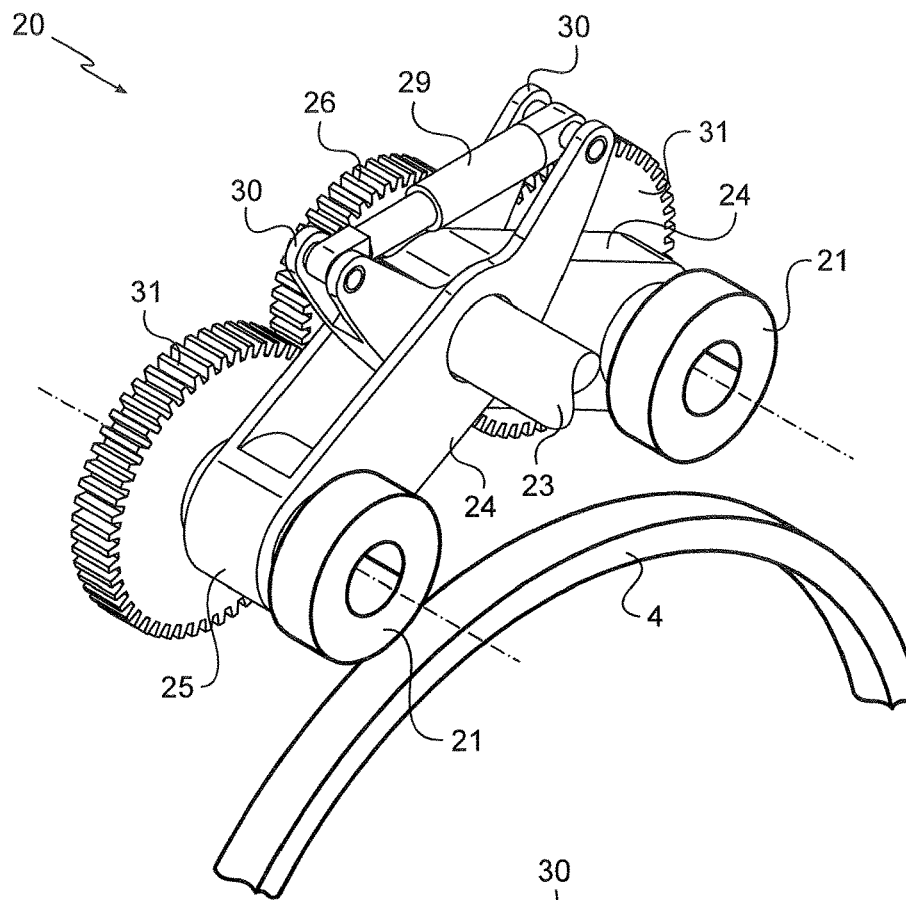
FIGS. 3a and 3b are diagrams showing the positions of the rollers engagement on and disengagement from the wheel driving track.
Figure 3B:
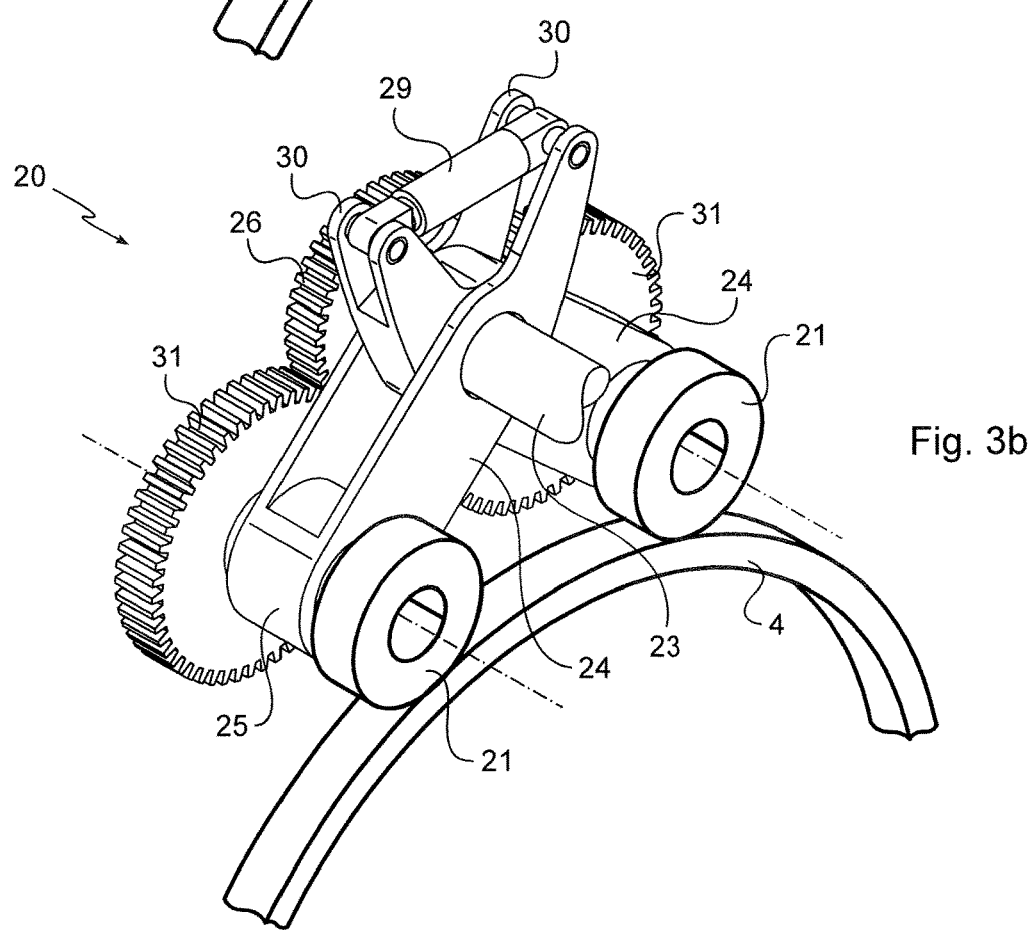

The assembly 20 is shown in greater details in FIGS. 3a and 3b. It comprises a central axis 23, so mounted as to pivot at the end of the base 22, along an axis parallel to the X axis. Arms 24 are scissors-mounted directly on the central axis 23, which then operates as a common pivot. The ends 25 of the arms 24 are facing the driving track 4 and rollers 21 mounted to rotate along axes parallel to the X axis are mounted thereon. The rollers 21 are associated with driving pinions 31 which engage on a central pinion 26 integral with the central axis 23 which then operates as a shaft. Although the central axis 23 is shown here cut, for a greater clarity, it further supports the driving wheel 27 which is shown in FIG.

2. A transmission, here a chain 28 (also shown in FIG. 2), extends between the output wheel 14 of the driving actuator 11 and the driving wheel 27, so that the rollers 21 can be rotationally driven by the driving actuators 11, whatever the angular position of the arms 24 around the central axis 23.

A positioning actuator 29 is connected between the ends 30 of the arms 24 facing those supporting the rollers 21. FIG. 3a shows the maximum length of the positioning actuator 29. In such a configuration, the rollers 21 are spaced from the driving track 4, so that the assembly 20 is in a disengaged position. Here, the positioning actuator 29 is of the telescopic type, and may interchangeably be electric or hydraulic. FIG. 3b shows the positioning actuator 29 controlled for exerting a constant force which tends to place the arms 24 closer to one another so that the rollers 21 contact the driving track 4 and are held in such engaging position by the determined contact force. In this position, the positioning actuator 29 is not internally abutting, so that the arms 24 can move aside or get closer to one another according to the deformations of the driving track resulting from the airplane taxiing. In the same manner, the arms are angularly free to accommodate any deformation of the wheel 3. Flexible guides or blades shall advantageously be provided to prevent any unduly tilting of the assembly 20 when the latter is in the release position.

The structure of the driving device according to the invention is thus very simple, with a stationary driving actuator, and a particularly simple actuating sequence. Movable elements are strictly minimized. No uncoupling of the transmission is required.

The invention is not limited to what has just been described, but encompasses any alternative solution within the scope of the claims.

Although the driving device comprises here only one assembly, several assemblies connected to the same driving actuator may specifically be used.

Although the transmission member illustrated here is a chain, it may, more generally, be any flexible endless element, such as a belt or a cable positioned as described above, and, even more generally, any transmission member such as a cardan drive, for instance.

Although the arms 24 are scissors-mounted here on a common pivot, the arms may of course be spread-mounted. The operation direction of the actuator shall then be reversed. Besides, the arms may be mounted on different pivots.

Eventually, although the positioning actuator is, in the illustrated example, positioned between the arms, it may, more generally, be positioned on the assembly, so as to move the rollers from the engaging position to the disengaging position, while leaving angular freedom to both arms to accommodate any deformation of the wheel.

The invention claimed is:

1. An assembly for rotationally friction driving a wheel of an airplane mounted as to rotate about a wheel axis of rotation on an axle carried by a lower part of an airplane landing gear, the wheel being provided with an annular driving track centered around the wheel axis of rotation and having a surface which extends parallel to said wheel axis of rotation, with the assembly comprising:
    a base configured to be fixed to the lower part of the landing gear;
    two arms mounted to pivot on the base along an arms' pivot axis parallel to the wheel axis of rotation;
    rollers so mounted as to rotate at the end of each arm about a roller axis of rotation, with each roller being associated with a pinion for rotationally driving the roller;
    a central pinion so mounted as to rotate along the arms' pivot axis so that the rollers' driving pinions engage with the central pinion; and
    a drive actuator so acting on the arms of the assembly as to position said arms either in a disengaged position in which the rollers are separated from the drive track, or in an engaged position in which the rollers are held to rest on the drive track with a predetermined bearing force.

2. The assembly according to claim 1, wherein the drive actuator comprises a positioning actuator coupled between ends of the arms facing the ends of the arms supporting the rollers.

3. The assembly according to claim 1, wherein the arms are mounted so as to have a scissor-like configuration on a common pivot.

4. The assembly according to claim 3, wherein the common pivot consists of a shaft coupled with the central pinion.

5. A friction rotational driving device comprising:
    at least one assembly according to claim 1, so positioned as to cooperate with the wheel to be driven;
    a rotational driving actuator integral with the lower part of the airplane landing gear and having an output shaft; and
    a motion transmitter for transmitting a rotation motion between the output shaft of the driving actuator and the central pinion of the assembly.

6. The driving device according to claim 5, wherein the actuator output shaft is so mounted as to rotate along an axis of rotation parallel to the axes of rotation of the rollers, with transmission means comprising a flexible endless driving element wound around a driving member integral with the output shaft of the driving actuator, and around a driving member associated with the central pinion of the assembly.

7. The driving device according to claim 6, wherein the flexible endless driving element comprises at least one of a chain, a belt and a cable.

8. The assembly according to claim 1, wherein the arms are mounted so as to have a scissor-like configuration on different pivots.

9. The assembly according to claim 1, wherein in both the engaged and disengaged positions, the roller's axis of rotation, the arm pivot axis, and the wheel axis of rotation are all parallel.

10. The assembly according to claim 1,
    wherein each of the two arms has opposed ends, on one end is disposed a roller and on an opposite end is a coupling to the drive actuator and between the two ends is the pivot axis, and
    wherein the drive actuator is operable between an extension position and a retraction position, thereby providing a scissor-like action to move the rollers between the engaged and disengaged positions with respect to the drive track.

* * * * *